May 21, 1940.  A. E. KROGH  2,201,946
CONTROL SYSTEM
Filed Sept. 16, 1936  3 Sheets-Sheet 3

INVENTOR.
ANKER E. KROGH
BY George W. Mucheaut
ATTORNEY.

Patented May 21, 1940

2,201,946

UNITED STATES PATENT OFFICE 2,201,946

CONTROL SYSTEM

Anker E. Krogh, Philadelphia, Pa., assignor to The Brown Instrument Company, Philadelphia, Pa., a corporation of Pennsylvania Application September 16, 1936, Serial No. 101,063

15 Claims. (Cl. 266—5)

The present invention comprises improvements in methods of, and apparatus for the automatic control of soaking pits and other metallurgical furnaces.

One object of the invention is to provide a control system which will be responsive to significant condition changes resulting from the aggregate of minor condition changes, which individually have little or no effect on the control system. In particular it is the object of the invention to effect an accurate control of the heat supply to the pit of a soaking pit in response to a pit temperature condition which is an average of the temperature conditions prevailing in different portions of the pit.

The invention is of especial utility in controlling the operation of a gas fired soaking pit, used in connection with a metal rolling mill for heating and storing metal billets in readiness for the rolling operation. In such case, it is desirable to maintain an approximately constant general pit temperature, to the end that the billets, when removed therefrom, are at an approximately uniform temperature, so that the rolling mill apparatus, in which the billets are then rolled, may convert the billets into uniformly rolled sheets or other rolled articles, with a minimum readjustment of said apparatus. The heat requirement of such a soaking pit depends both on the rate at which billets are lodged or stored in, and on the rate at which the billets are removed from the pit as well as upon the length of time lodged therein. The removal of billets from the soaking pit at irregular intervals, as a result of delays in the rolling of billets previously removed, tend to variations in the number of billets held in the pit at any one time, and to consequent variations in the rate at which the billets in the pit absorb heat.

The opening of the pit for the deposit or removal of billets, results in pit heat losses and pit temperature decreases, so that an accurate measurement of the effective pit temperature is needed for a suitably accurate control of pit operating conditions.

A furnace temperature of the order of the pit temperature is ordinarily measured conveniently by pyrometric means, including, for example, a thermocouple inserted through the roof or side wall of the furnace, and connected to a suitable instrument. I have found, however, that the temperature of any thermocouple inserted into a soaking pit through a roof or side wall, is so greatly influenced by the temperature of the billet nearest thereto, that it does not form a reliable means for determining the actual heat condition in the pit. Ordinarily, a billet when first placed in a pit, is relatively cool, and if placed close to a thermocouple, the latter will then indicate a temperature much lower than the significant pit temperature. The gas-fired soaking pit may be of the type shown and described in Morton et al. Patent 2,079,560. On the other hand, when the thermocouple is adjacent a billet which has been in the pit for an appreciable period, the thermocouple will indicate a temperature higher than the significant pit temperature. Control in accordance with the temperature of a thermocouple in proximity to a relatively cool billet, or in proximity to a relatively hot billet, tends in the one case, to an over-supply of heat to the pit, and possible injury to the latter and its contents, and tends in the other case to under-heating of the pit and billets.

In accordance with the present invention, I obtain a reliable indication of, and control from the significant pit temperature by means of a plurality of thermocouples so distributed and arranged that the removal or addition of a billet will not substantially affect the measuring and control system, which is thus made continuously responsive to the significant pit temperature condition.

A further specific object of the invention is to avoid operative disturbances by interrupting the supply of fuel gas and combustion air to the pit when the latter is opened for billet insertions and removals, and the invention in its preferred form comprises a control system effective for the purposes previously described, and including means automatically interrupting and restarting the fuel gas and combustion air supplies to the pit, when the pit cover is removed and put back into place.

In a preferred form of the present invention, I provide means automatically making the heat supply to the pit primarily responsive to the general pit temperature condition, coupled with means responsive to the rate of heat supply automatically limiting that rate to a safe maximum when the general pit temperature condition is low enough to tend to make said rate excessively large. In the preferred embodiment of the invention illustrated, the rate of supply of fuel gas to the pit is directly controlled by the general pit temperature and said rate, and separate proportioning means are provided to regulate the rate at which combustion air is supplied, as required to hold the last mentioned rate in suitable predetermined proportion to the rate of fuel gas supply.

The various features of novelty which characterize my invention are pointed out with particularity in the claims annexed to, and forming a part of this specification. For a better understanding of the invention, however, its advantages, and specific objects attained with its use, reference should be had to the accompanying drawings and descriptive matter in which I have illustrated and described a preferred embodiment of the invention.

Figure 1:
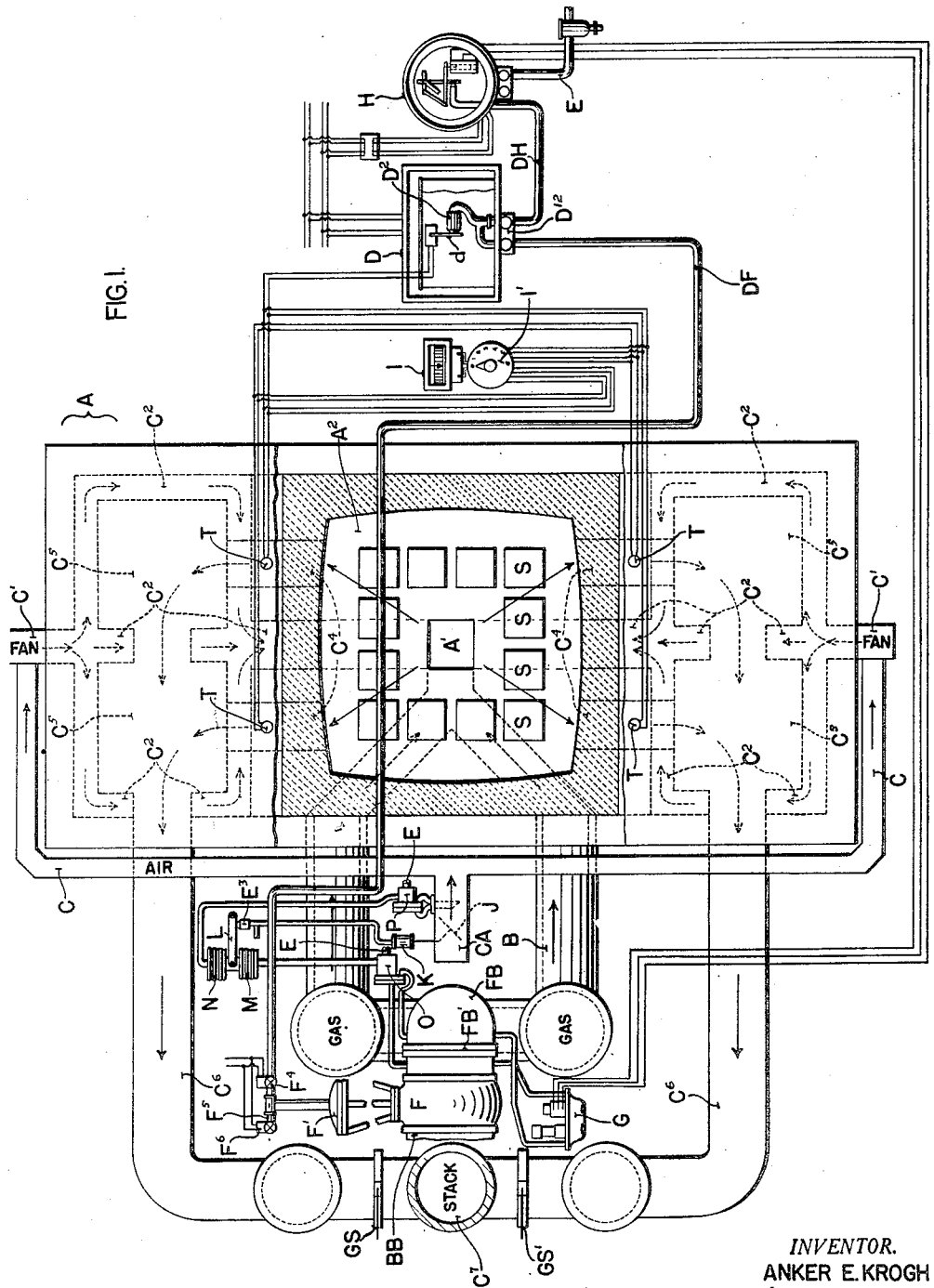
Fig. 1 is a somewhat diagrammatic plan view of a soaking pit and its fuel gas and air supply connections, stack connections, and associated control means, the heating chamber of the soaking pit being shown in plan section.

The soaking pit furnace A, somewhat conventionally illustrated in Fig. 1, has fuel gas ducts B supplying fuel gas to a burner port A' opening to the pit heating chamber or pit $A^2$ through the bottom wall of said chamber. Combustion supporting air is supplied through ducts C and fan C' to the air passages $C^2$ of two recuperators $C^5$, one at each side of the pit or chamber $A^2$, and preheated air to the chamber $A^2$ through the burner port A'. Products of combustion pass from the chamber $A^2$ to the waste gas passages of the recuperators $C^5$ through outlet ports $C^4$ located at the bottom of the chamber $A^2$ and pass therefrom to the stack or exhaust pipe $C^7$ through stack ducts $C^6$. The top of the pit or chamber $A^2$ is normally closed by a lid or cover $A^3$ (Fig. 3), which is removed to permit the insertion and removal of billets by a crane hoist. Usually, the lid $A^3$ is replaced after the removal of a billet, and is removed for, and replaced after the insertion of one or more cold billets replacing hot billets previously removed. The frequent opening and closing of the pit contributes to the disturbance of the pit temperature conditions, and the control apparatus of the present invention is intended to correct for such disturbances, as required to the maintenance of a suitably close approximation to the desired constant average pit temperature condition.

The control apparatus includes as its primary actuating elements, a plurality of thermo-responsive devices T, which may be thermocouples connected in series, or as shown, in parallel to a control instrument D. The thermocouples T are preferably distributed about the pit, and are preferably shielded from direct heat radiation from the billets. As shown, the thermocouples are placed in, and adjacent the inlet end of the gas off-take ducts $C^4$.

As diagrammatically illustrated in Fig. 1, the instrument D includes pneumatic control provisions comprising a flapper valve d, adjusted by the deflection of the pointer D' of a galvanometer, to the terminals of which the devices T are connected. The galvanometer deflections cause the flapper valve d to move toward and away from, and thereby controls the discharge to the atmosphere, of air supplied under pressure to the nozzle or bleeder outlet $D^2$ of the pneumatic control system. Air is supplied to the nozzle $D^2$ through a pipe DH including a restricted orifice DH', from a supply pipe E. The pipe E receives air under a suitable and approximately constant pressure from a compressed air source of supply (not shown). The pipe E is connected to the pipe DH and thereby to the nozzle $D^2$ of the instrument D, through a pressure regulating valve mechanism forming a part of the hereinafter described instrument H. As the flapper d is moved toward and away from the nozzle $D^2$, the pressure in the latter, and in the portion of the pipe DH at the outlet side of the orifice DH', will be correspondingly increased and decreased.

The instrument D may well not be as simple in construction and operation, as illustrated diagrammatically in Fig. 1, but may be of one or another of various known forms of a pneumatic control instrument, or so-called air actuated controller, including mechanism for varying a control pressure in accordance with the deflection of the galvanometer. In particular, the instrument D may be a potentiometric instrument of the type shown in Fig. 2, and illustrated and described in Patent No. 2,159,971, granted May 30, 1930, on my prior application, filed April 22, 1936, including a motor actuated relay mechanism through which the deflection of the pointer D' of a galvanometer connected to and responsive to the average of the voltages of the devices T, adjusts a potentiometer recorder carriage $D^5$, to different positions, corresponding to the different values of said voltage average. The carriage $D^5$ cooperates with a normally stationary control table $D^6$, which may be adjustable along the path of movement of the carriage $D^5$, and the position of which, along said path, is a measure of the normal value of the average thermocouple voltage to which the galvanometer of the instrument responds.

The adjustment of the carriage $D^5$ relative to the stationary control table $D^6$, gives up and down movements to a link $D^7$ and thereby oscillates a rocking element $D^8$. The latter is connected by a link $D^9$ to an actuating lever $D^{10}$ by which the flapper valve d of the instrument D is adjusted.

The instrument D as shown, also comprises a mechanism $D^{11}$ through which an initial change in the control pressure due to the adjustment of the flapper d, produced by a change in the position of the carriage $D^5$, results in an immediate follow-up adjustment of the control pressure, partially neutralizing the effect of the initial change therein, and in a delayed compensating adjustment neutralizing in whole or in part, the effect on the control pressure of the follow-up adjustment.

Figure 2:
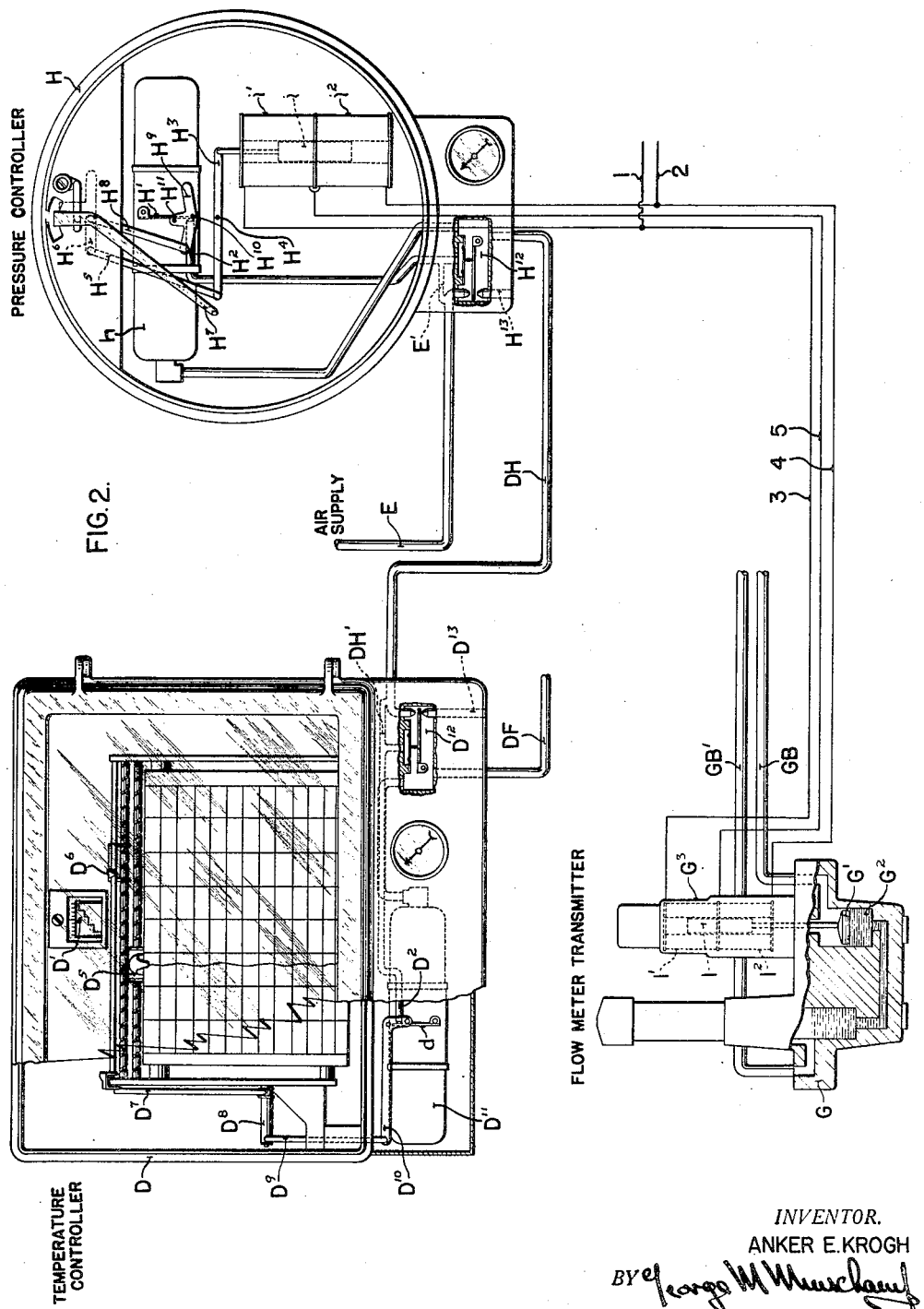
Fig. 2 is a somewhat diagrammatic representation on a larger scale than Fig. 1, of portions of the control apparatus shown in Fig. 1.

As shown in Fig. 2, the air under pressure, supplied by the portion of the pipe DH at the inlet side of the restricted orifice DH' to actuate the mechanism $D^{11}$, and to actuate the hereinafter mentioned control valve F, is passed to the latter and to the mechanism $D^{11}$ through a pilot valve chamber $D^{12}$, which receives air from the pipe DH, and bleeds air through a vent $D^{13}$, as required to maintain a pressure in the chamber $D^{12}$ proportional at all times to the pressure in the nozzle $D^2$.

For the purpose of the present invention, the only important characteristic of the instrument D, is that it varies the pressure in the pilot valve chamber $D^{12}$, in predetermined accordance with variations in the average of the voltages of the thermocouples T. Further reference to the details of construction and operation illustrated and described in my above mentioned prior application, is thus unnecessary, particularly as the potentiometric mechanism of the instrument D is of the commercial type employed in the "Brown potentiometer," made and sold on an extensive scale by my assignee, The Brown Instrument Company, and the air actuated control mechanism D¹¹ is of the commercial type employed in the "Air-O-Line" controller made and sold by said assignee.

The variable control pressure maintained in the pilot valve chamber D¹², is transmitted by a pipe DF to pneumatically actuated means controlling the flow of gas through the pipes B to the pit A. Said means, as shown, comprises a diaphragm, or fluid pressure motor, valve F including a pressure chamber F' having a portion of its wall formed by a diaphragm acting on the movable valve member F² of the valve F in the direction to open the valve, against the opposing action of a spring F³. The outlet of the valve F is connected by a pipe FB to the pipes B, and the inlet of the valve is connected to a gas supply main or pipe BB. Normally, the motor chamber F' of the valve F is in free communication with the pipe DF, so that the amount of flow past the valve member F² directly depends upon the pressure in the pipe DF required to hold the valve member F² in the position in which the tension of the spring F³ balances the opposing action of the pressure in the chamber F'.

To prevent gas flow into the pit when the lid or cover A³ is raised, and the pit chamber is open to the atmosphere, I advantageously provide means for closing the valve F regardless of the pressure in the pipe DF, whenever the cover A³ is raised from its seat. To that end, in the arrangement shown, I connect the pipe DF to the valve chamber F' through a normally open cut-off valve F⁴, and provide a vent connection F⁶ through which the chamber F' is open to the atmosphere, when a normally closed cut-off valve F⁵ in the connection F⁶, is permitted to open.

Figure 3:
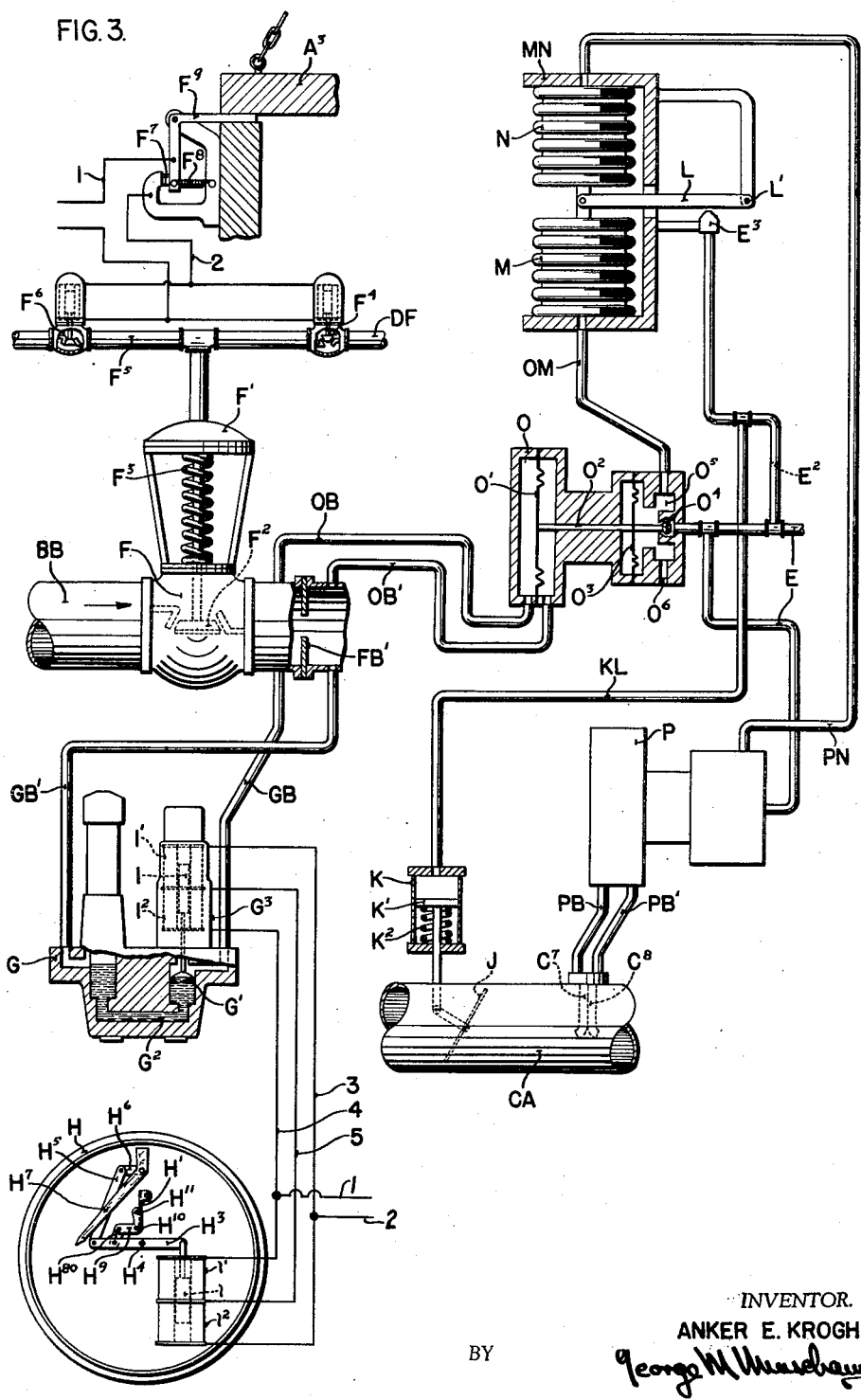
Fig. 3 is another diagrammatic representation on a larger scale than Fig. 1, of portions of the control apparatus shown in Fig. 1.

As shown, the valves F⁴ and F⁵ are electromagnetic valves having their windings connected to electric supply conductors 1 and 2, through a switch F⁷, when the latter is closed. The switch F⁷ is biased for movement into its open position by a spring F⁸, but is held in its closed position by engagement of a switch actuating arm F⁹ by the lid A³, when the latter is closed, as shown in Fig. 3. With the switch F⁷ in its closed position shown in Fig. 3, the windings of both valves F⁴ and F⁵ are energized, and the movable valve member of the valve F⁴ is then held in its open position, while the movable valve member of the valve F⁵ is held in its closed position. When the lid A³ is lifted, and the switch F⁷ opens, the movable valve member of the valve F⁴ is gravitationally moved to its closed position, and the movable member of the valve F⁵ is gravitationally moved to its open position.

The instrument H, which, as previously stated, regulates the air pressure supplied to the pipe DH, is responsive to the rate of gas flow from the main BB to the pipes B. As illustrated in the drawings, the instrument H is thus made responsive to the rate of fuel gas flow to the pit, by means comprising a measuring orifice FB' formed in the pipe section FB, and a U tube manometer G. The latter has one leg connected by a pressure transmitting pipe GB to the pipe FB at the inlet side of the orifice FB', and has its other leg connected by a pressure transmitting pipe GB' to the pipe FB at the outlet side of the orifice FB'. A float G' resting on the manometer sealing liquid G², which may be mercury, is given rising and falling movements as a result of the sealing liquid displacement produced by decreases and increases, respectively, in the rate of flow through the pipe FB.

The float G' supports and gives movement to the armature I of the transmitter element of an inductance bridge of the character disclosed in the Harrison Patent No. 1,743,853. The said transmitter element comprises two end to end vertically disposed coils I' and I² surrounding a manometer leg portion G³ in which the armature I is axially movable. The instrument H includes the receiver element of the inductance bridge, which comprises vertically disposed end to end coils $i'$ and $i^2$, in which the core $i$ is axially movable. The remote ends of the coils I and I² are connected by bridge conductors 3 and 4, respectively, to the remote ends of the coils $i'$ and $i^2$. The adjacent ends of the coils I' and I² are connected by bridge conductor 5 to the adjacent ends of the coils $i'$ and $i^2$. The bridge is energized by alternate current supply conductors 1 and 2, connected to the conductors 3 and 4, respectively. The winding direction is the same in coils I' and I², and is the same in coils $i'$ and $i^2$.

With the inductance bridge arranged and energized as described, an up-movement, for example of the transmitter armature I increases the impedance of the coil I' and decreases the impedance of the coil I². Those impedance changes result in a change in the relative current flows between the energizing conductors 1 and 2 through the transmitter and receiver coils and thereby cause a current flow through the conductor 5 and an increase of current flow through the coil $i'$ relative to the current flow through the coil $i^2$, and causes the armature $i$ to move upward until the resultant increase in the impedance of the coil $i'$ relative to the impedance of the coil $i^2$, makes the impedance ratio of coils $i'$ and $i^2$ equal to the impedance ratio of the coils I' and I². This interrupts the current flow through conductor 5 and reestablishes the balanced condition of the bridge. The movement given to the armature $i$ will thus be proportional to the up or down movement of the armature I, and the position of the receiver armature $i$ is thus dependent upon the position of the armature I, for all values of the differential of the pressures at the opposite sides of the orifice FB'.

The instrument H includes a flapper valve H' and a nozzle H², the latter being connected to the air supply pipe E through a restricted orifice E'. The relative adjustment of the flapper H' and nozzle H² is dependent upon the position of the armature $i$. Changes in position of the armature $i$, effect the adjustment of the flapper valve H' through a lever H³ pivoted at H⁴, and from one end of which the armature $i$ is suspended. The opposite end of the lever H³ is connected by a link H⁵ to an oscillating element H⁶, which may carry an exhibiting arm H⁷ for indicating or recording the pit chamber pressure. The oscillatory movements of the lever H³ effected by movements of the armature $i$, give movements to the flapper H' relative to the nozzle H². In the commercial form of the instrument H, shown in outline in Fig. 2, the flapper valve H' is thus actuated through the link H⁵ and means through which the up and down movements of that link give up and down movements to the upper end of a link H⁸. The lower end of the link $H^8$ is pivotally connected to a flapper actuating lever $H^9$, which is pivoted at $H^{10}$ and provided with a pin or shoulder $H^{11}$ which engages the flapper $H'$. The flapper is moved away from the nozzle $H^2$ by a clockwise adjustment of the lever $H^9$, and is spring biased for movement toward the nozzle when the lever $H^9$ is turned counter-clockwise.

The commercial form of air controller shown in outline in Fig. 2, is manufactured by The Brown Instrument Company, and commercially known as the "full throttler" controller, which includes a mechanism $h$, disclosed in the Patent of Moore, No. 2,125,081, granted July 26, 1938, on an application filed October 4, 1935, for automatically adjusting the position of the supporting pivot $H^{10}$ for the lever $H^9$ on the initial change in the control pressure in the nozzle $H^2$. The purpose of such adjustment of the pivot $H^{10}$, is to effect a follow-up adjustment of the flapper $H'$ partially eliminating its previous adjustment which produced the initial control pressure change. Further reference to the follow-up adjustment mechanism is unnecessary herein, because that mechanism is now known, is in commercial use, and is fully disclosed in the above mentioned Moore application, and also because of the fact that for the general purposes of the present invention, the pivot $H^{10}$ may be stationary, and the lever $H^9$ may be operated through a link $H^{80}$ directly connecting the lever $H^9$ to the lever $H^3$, as shown in Fig. 3.

The instrument H, as shown in Fig. 2, includes a pilot valve mechanism comprising a chamber $H^{12}$ and a vent $H^{13}$ like the chamber $D^{12}$ and vent $D^{13}$, respectively, of the pilot valve mechanism of the instrument D. The pilot valve mechanism receives air from the pipe E and discharges air through the vent $H^{13}$ as required to maintain an air pressure in the chamber $H^{12}$ in constant proportion to the pressure in the nozzle $H^2$. The pipe DH is connected to the chamber $H^{12}$, and the pressure transmitted to the pilot valve chamber $D^{12}$ of the instrument D, is thus directly dependent upon the pressure in the nozzle $H^2$, and hence upon the rate at which gas passes from the valve F through the pipe FB and conduits B to the furnace.

As already indicated, the ultimate purpose of the instrument H, aside from its function of measuring and recording the rate of fuel gas supply to the furnace, is to limit the maximum rate at which fuel gas is supplied to the furnace, and to regulate and restrict the rate at which fuel gas is supplied to the furnace when the thermocouples T indicate an abnormally low general pit temperature condition. Advantageously, the apparatus is so arranged that when the general pit temperature condition is within a normal working range, variation in that condition will result in corrective adjustments tending to restore the condition to a predetermined normal value as rapidly as is practically desirable, such as might be effected under those conditions by the instrument D if the action of the latter were not modified by the action of the instrument H. In such case, the instrument H is needed, and its control operation becomes really significant only when the general pit temperature condition is abnormally low.

For efficient combustion, it is practically essential that the rate of supply of combustion air should be kept in close proportion to the rate of supply of fuel gas. The rate of air supply may be directly controlled by the instrument D through control means similar to those employed in controlling the rate of fuel gas supply. Advantageously, however, and as shown, the rate of air supply is directly controlled by the rate of fuel gas supply through suitable proportioning means.

As shown, the supply of air to the pit is directly regulated by a butterfly valve or pivoted damper J in the inlet CA, through which the piping C receives air from the atmosphere. The damper J is actuated by a relay cylinder K, including a piston $K'$, having its stem connected to an operating arm of the valve J, and subjected to the opposing action of a spring $K^2$, and of the pressure transmitted to the upper end of the cylinder by a pipe KL, the pressure tending to close, and the spring tending to open the damper J. The pressure transmitted by the pipe KL to the cylinder K is directly controlled by the adjustment of a flapper valve L, and the adjustment of that valve is jointly dependent on the rate of gas flow through the conduit FB and on the rate of air flow through the inlet CA.

The flapper valve L controls the pressure in the pipe KL, by its movement toward and away from a nozzle $E^3$ receiving air from a branch of the supply pipe E including a restricted orifice $E^2$, the pipe KL being connected to said branch at the outlet side of the orifice $E^2$. The flapper valve L has one end pivotally connected at $L'$ to a support MN for two aligned bellows elements M and N, the adjacent movable end walls of which are connected to the end of the flapper L remote from its pivotal connection $L'$. The pressures in the bellows M and N are automatically varied in accordance with changes in the gas and air supplies, respectively.

The pressure in the bellows M is made dependent upon the rate of gas flow through the pipe FB by means of a known device O, sometimes called a static converter. The device O comprises a diaphragm $O'$ separating chambers connected by pipes OB and OB' to the pipe FB at the high and low pressure sides, respectively, of the orifice FB'. The diaphragm $O'$ is connected by a plunger or stem $O^2$ to a diaphragm $O^3$ and to a valve $O^4$. The latter controls the admission of air from a branch of the air supply pipe E to a chamber $O^5$ of the member O, one wall of the last mentioned chamber being formed by a diaphragm $O^3$. The side of the diaphragm $O^3$ remote from the chamber $O^5$ is exposed to atmospheric pressure. The chamber $O^5$ is formed with a restricted vent to the atmosphere, or bleed outlet $O^6$. The chamber $O^5$ is connected by a pipe OM to the interior of the bellows M. The differential between the higher pressure transmitted by the pipe OB, and the lower pressure transmitted by the pipe OB', tends to move the diaphragm $O'$ in the direction to give the valve $O^4$ an opening adjustment and thereby admit air from the pipe E to the chamber $O^5$, and increase the pressure in the latter. The effect of the said differential on the stem $O^2$ and valve $O^4$ is opposed by the action of the pressure in the chamber $O^5$ on the diaphragm $O^3$. The net resultant action of the two diaphragms is to normally maintain the valve $O^4$ in the position required to maintain a pressure in the chamber $O^5$, which is in constant proportion to the differential of the pressures acting on the diaphragm $O'$, notwithstanding the continuous escape of air from the chamber through its vent $O^6$. The pressure transmitted by the pipe OM from the chamber $O^5$ to the bellows M, is thus normally proportional to the square of the velocity of flow of fuel gas to the furnace through the pipe FB.

The device P may be a static converter, identical in construction with the device O, and transmits to the bellows N through a pipe PN from a chamber corresponding to the chamber $O^5$ of the device O, a pressure proportional to the square of the velocity of air flow through the inlet CA. To avoid unnecessary throttling of the inlet connection CA, the latter is not provided with a restricted measuring orifice as is the pipe FB. In lieu of such a measuring orifice, the inlet connection CA is shown as provided with a Pitot tube arrangement comprising pipes $C^7$ and $C^8$ having open ends within the inlet connection CA which face in opposite directions. The pipe $C^7$ which has its open end facing toward the inlet end of the inlet connection CA, has its other end connected to the device P by a pipe PB corresponding to the previously mentioned pipe OB. The second end of the pipe $C^8$ is connected to the device P by a pipe PB' corresponding to the previously mentioned pipe OB'.

In operation, on an increase in the rate of fuel gas flow through the pipe FB, the device O operates to increase the pressure transmitted by the pipe OM to the bellows M, with the result of moving the flapper L away from the nozzle $E^3$ and diminishing the pressure transmitted by the pipe KL to the device K. The latter thereupon gives an opening adjustment to the damper J, increasing the rate at which combustion air is supplied to the furnace. As the air supply to the furnace increases, the device P is actuated to increase the pressure transmitted by the pipe PN to the bellows N, and move the flapper L back toward the nozzle $E^3$ and thereby restore a portion of the decrease in the pressure transmitted to the device K by the pipe KL, which was effected by the increase in pressure in the bellows M. The net result of the operation of the devices O and P on the damper J, is to normally maintain the latter in the position in which the rate of air supply through the air inlet connection CA is in constant proportion to the rate of gas supply through the pipe FB, as is required for the maintenance of efficient combustion conditions.

With the damper J biased for movement into its wide open position by the spring $K^2$, a failure in the control system which leaves the damper J wide open, avoids the risk of explosions in the furnace, which would exist if the damper J might close under such conditions in which the supply of gas to the furnace is continued.

The general operation of the apparatus disclosed will be apparent from what has already been said. Under relatively steady average load conditions which can be expected to prevail at most times, considerable variation in the rate of gas flow supply is required to compensate for the effect of replacing hot billets by cold billets. With properly designed apparatus, however, it need not make the effect of the instrument H on the air pressure transmitted by the pipe DH to the instrument D, great enough to make the operation of the instrument D significantly different in character from what it would be if the air pressure in the pipe DH were then constant at its average value under such conditions. When as a result of an unusually low general pit temperature condition, the instrument D tends to make the gas flow to the furnace undesirably large, as it would if the pressure in the pipe DH remained constant, the action of the instrument H does significantly reduce the pressure in the pipe DH, and thereby serves a practically important safety purpose.

A practical effect of the described conjoint use of the instruments D and H is to permit the instrument D to make greater corrective adjustments in the rate of fuel gas supplied to the furnace under the normal operating conditions which can be expected to prevail at most times, than would be permissible if the instrument H did not provide protection against excessive increases in the rate of gas flow under less usual conditions of operation.

The air and gas supply proportioning means described, are relatively simple, and are well adapted to maintain the close control of the air fuel ratio required for efficient combustion. The provisions including the switch $F^7$, by which the fuel supply valve is closed, regardless of pit temperature conditions, when the pit chamber is opened, or when the electrical power source fails, reduces the risk of flame outbursts from the opened pit chamber, which would exist if the gas flow to the furnace were then continued at a rate corresponding to the existing general pit temperature condition. The control system as a whole is characterized by its relative simplicity and reliability, and by the effective use in the instruments D and H of instrument features which, for the most part, are of approved commercial types, developed initially for other and quite different control purposes.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. In the operation of a furnace for heating and keeping hot a plurality of bodies of substantial heat absorbing capacity and which may be at different temperatures, the method which consists in regulating the supply of heat to said furnace by and in accordance with the collective effect of the temperatures at a plurality of furnace points at which the temperatures are significantly dependent on the temperatures of the said bodies, respectively adjacent the said points.

2. In the operation of a pit furnace holding a plurality of billets which are to be heated and kept hot and which are received and removed at intervals, the method which consists in regulating the supply of heat to said furnace by and in accordance with the collective effect of the temperatures at a plurality of furnace points at which the temperatures are significantly dependent on the temperatures of billets respectively adjacent said points.

3. In the operation of a furnace holding a plurality of billets which are received and removed at intervals, and having a removable closure member which is removed for the reception and removal of the billets, the method which consists in normally regulating the supply of heat to said furnace by and in accordance with the collective effect of the temperatures at a plurality of furnace points at which the temperatures are significantly dependent on the temperatures of billets respectively adjacent said points, and in interrupting the supply of heat when said member is removed.

4. The combination with a heating chamber adapted to hold a plurality of bodies of substantial heat absorbing capacity and at different temperatures, of means for regulating the supply of heat to said chamber in joint response to the temperatures in different portions thereof.

5. The combination with a heating chamber adapted to hold a plurality of bodies to be heated having substantial heat absorbing capacities and including means for opening said chamber for the insertion and removal of said bodies, of means normally effective to regulate the supply of fuel to said chamber in collective accordance with the temperatures at different points in said chamber, and means for automatically interrupting the supply of fuel to said chamber when the latter is opened.

6. In a control system, the combination of air controller means responsive to one control condition for maintaining control air under a pressure varying in accordance with changes in said condition, other air controller means responsive to a second condition for reducing said control air pressure in accordance with changes in said second condition, and control means actuated by and in accordance with the reduced pressure of said control air.

7. In a control system, the combination with an air controller instrument responsive to a control condition and including a flapper valve adjusted in accordance with changes in said condition to thereby vary a control air pressure, of a second air controller responsive to a second control condition supplied with air at said pressure by the first mentioned instrument and including a flapper valve adjusted in accordance with changes in said second condition to thereby reduce the variable pressure of the air supplied, and control means actuated by the air supplied to the second controller in accordance with the pressure to which the air is reduced by said second controller.

8. The combination with a heating chamber, of heating means therefor comprising separate and separately regulable means for supplying fuel and combustion air to said chamber for combustion therein, means responsive to the rate at which fuel is supplied to said chamber for adjusting the combustion air supply means, fuel controlling means responsive to a chamber temperature condition for adjusting the fuel supply means to increase and decrease the fuel supply as said temperature condition varies in one direction or the other, and means responsive to the rate at which fuel is supplied to said chamber for modifying the action of said fuel controlling means and thereby varying the relation of the fuel supply rate to said condition as said rate changes.

9. The combination with a heating chamber, of heating means therefor including regulable means for supplying fuel to said chamber for combustion therein, adapted to vary the rate at which fuel is supplied in accordance with variations in a control force, control means responsive to a chamber temperature condition for subjecting said regulable means to a control force varying with said condition, and means responsive to the rate at which fuel is supplied to said chamber for adjusting said control force to vary its relation to said condition.

10. Fluid proportioning apparatus comprising in combination, a first conduit containing flowing fluid, a second conduit containing flowing fluid, means for controlling one of said fluid flows including a pressure responsive motor, a space supplied with air under pressure communicating with said motor, a valve controlling the pressure in said space and a pair of opposed pressure responsive elements for controlling said valve, a pair of devices associated respectively with said first and second mentioned conduits, each of said devices including a space communicating respectively with one of said elements and supplied with air under pressure, a valve for controlling the pressure in said space, and means responsive respectively to the fluid flow in one of said conduits for controlling said valve.

11. Fluid proportioning apparatus comprising in combination, a first conduit containing flowing fluid, a second conduit containing flowing fluid, means for controlling one of said fluid flows including a motor, a pair of members the relative positions of which control said motor and a pair of opposed pressure responsive elements for controlling the relative positions of said members, a pair of devices associated respectively with said first and second mentioned conduits, each of said devices including a space communicating respectively with one of said elements and supplied with air under pressure, a valve for controlling the pressure in said space, and means responsive respectively to the fluid flow in one of said conduits for controlling said valve.

12. Fluid proportioning apparatus comprising in combination a first conduit containing flowing fluid, a second conduit containing flowing fluid, means for controlling one of said fluid flows including a motor and a pair of cooperating members the relative positions of which control said motor and opposed elements for controlling the relative positions of said members, and a pair of devices associated respectively with said first and second mentioned conduits, each of said devices including a pair of members cooperating to control one of said elements and the relative positions of which are varied respectively in accordance with the flow in said first and second mentioned conduits.

13. The combination with a soaking pit furnace comprising means for preheating a gaseous combustible medium and a heating chamber having a central port in its bottom wall through which said chamber receives preheated medium from said means and having lateral outlets through which combustion gases pass from the heating chamber to said preheating means, of a temperature responsive device located in each of said outlets in heat radiating relation with work being heated in said heating chamber and in heat conducting relation with the gases flowing through the outlet, and means for regulating the supply of said medium to said chamber in joint response to the temperatures of the different responsive devices.

14. In a control system, a device responsive to a variable condition, electrical means connected to said device to measure said condition, pneumatic control apparatus controlled by said means, a second device responsive to a second variable condition, second electrical means connected to said second device to measure said second condition, second pneumatic control apparatus controlled by said second means, and a pneumatic motor adapted to effect said conditions and jointly controlled by said first and second pneumatic control apparatus.

15. In a control system, a device responsive to a condition, a self-balancing electrical measuring instrument connected to said device and having an element deflecting in accordance with the value of said condition, pneumatic control apparatus supplied by air under pressure and including a motor for effecting said condition and means connected to said element for controlling the pressure to which said motor is subjected, a second device responsive to a second condition, a second self-balancing electrical measuring instrument connected to said device, and having an element deflecting in accordance with the value of said second condition, and second pneumatic control apparatus supplied by air under pressure and including means to control the pressure of the supply of air to the first mentioned control apparatus whereby said motor is adjusted jointly in response to the variations in said conditions.

ANKER E. KROGH.